(12) United States Patent
Kim et al.

(10) Patent No.: US 12,479,465 B2
(45) Date of Patent: Nov. 25, 2025

(54) AUTONOMOUS DRIVING CONTROL METHOD AND VEHICLE THEREOF

(71) Applicants: HYUNDAI MOTOR COMPANY, Seoul (KR); KIA CORPORATION, Seoul (KR)

(72) Inventors: Ho Jun Kim, Seoul (KR); Woo Joong Kim, Seoul (KR); Yea Bin Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 210 days.

(21) Appl. No.: 18/212,998

(22) Filed: Jun. 22, 2023

(65) Prior Publication Data
US 2024/0199066 A1  Jun. 20, 2024

(30) Foreign Application Priority Data
Aug. 31, 2022 (KR) .................. 10-2022-0110063

(51) Int. Cl.
*B60W 60/00* (2020.01)
*B60W 50/14* (2020.01)
*G01C 21/30* (2006.01)

(52) U.S. Cl.
CPC .......... *B60W 60/001* (2020.02); *B60W 50/14* (2013.01); *G01C 21/30* (2013.01); *B60W 2556/40* (2020.02)

(58) Field of Classification Search
CPC .......... B60W 60/001; B60W 50/14; B60W 2556/40; B60W 2552/53; B60W 60/0053; B60W 40/02; B60W 50/082; B60W 2050/143; B60W 2556/45; G01C 21/30
See application file for complete search history.

(56) References Cited

U.S. PATENT DOCUMENTS

| 11,238,607 B2 | 2/2022 | Huang et al. | |
| 2019/0295420 A1* | 9/2019 | Fu | G06T 7/248 |
| 2020/0118283 A1* | 4/2020 | Lee | G06T 7/536 |
| 2021/0312194 A1 | 10/2021 | Yang et al. | |
| 2021/0402992 A1* | 12/2021 | Morimoto | B60W 30/12 |
| 2022/0057216 A1* | 2/2022 | Zhang | G01C 21/30 |
| 2022/0297694 A1* | 9/2022 | Kikuchi | G06V 20/588 |

(Continued)

FOREIGN PATENT DOCUMENTS

| JP | 2018-200501 A | 12/2018 |
| KR | 10-1454153 B1 | 11/2014 |

(Continued)

*Primary Examiner* — Abby Lin
*Assistant Examiner* — Danielle M Jackson
(74) *Attorney, Agent, or Firm* — Morgan Lewis & Bockius LLP

(57) ABSTRACT

An autonomous driving control method receives a HD map and extracts a HD road boundary and a HD lane line based on the HD map. A real-time map displaying a road driving environment of a vehicle is generated using sensor information detected by a sensor mounted on the vehicle. A real-time road boundary and a real-time lane are extracted based on the generated real-time map. The HD road boundary is compared to and analyzed from the real-time road boundary, and the HD lane line is compared and analyzed to the real-time lane. It is determined whether the HD map has changed based on the analyzed result value.

6 Claims, 10 Drawing Sheets

(56) References Cited

U.S. PATENT DOCUMENTS

| | | | |
|---|---|---|---|
| 2022/0397419 A1* | 12/2022 | Stenneth | G01C 21/3885 |
| 2023/0298362 A1* | 9/2023 | Zhang | G06T 7/12 |
| | | | 382/103 |
| 2023/0366699 A1* | 11/2023 | Bande | G01C 21/3859 |
| 2024/0255305 A1* | 8/2024 | He | G01C 21/06 |

FOREIGN PATENT DOCUMENTS

| | | |
|---|---|---|
| KR | 10-2018-0106417 A | 10/2018 |
| KR | 10-2021-0029323 A | 3/2021 |
| KR | 10-2021-0077043 A | 6/2021 |
| KR | 10-2022-0029823 A | 3/2022 |

\* cited by examiner

| Step for width-based determination | Description (Condition) |
|---|---|
| 0 (not to perform) | - when there is no point for calculating the width of a lane of the input real-time map (RMG) |
| 1 (there is no change) | - when the number of widths that can be calculated is three or more and m/N is greater than or equal to 0.4, where N is the total number of widths that can be calculated and m is the number intervals the interval difference of which is less than 0.5 m |
| 2 (there is a change) | - when the number of widths that can be calculated is three or more and m/N is lower than 0.4 |
| 3 (determination impossible) | - when the number of widths that can be calculated is less than three |

| Step for location-based determination | Description (Condition) |
|---|---|
| 0 (not to perform) | - when there is no lane (road boundary) of the generated real-time map (RMG) |
| 1 (there is no change) | - when the total length of all comparable lane lines of the real-time map is N, and the total length of all lane lines of the real-time map located inside a bounding box (1.0 m X 0.3 m) is m, if m/N is greater than 0.7 or is greater than or equal to 0.4 and less than 0.7 according to a hysteresis threshold |
| 2 (there is a change) | - if m/N is smaller than 0.4 or is greater than or equal to 0.4 and less than 0.7 according to a hysteresis threshold |
| 3 (determination impossible) | - when the number of the lane lines of the real-time map do not satisfy a preset minimum number |

FIG. 7

| Step for width-based determination | Description (Condition) |
|---|---|
| 0 (not to perform) | - when there is no road boundary on the real-time map (RMG) a width between which and a lane line can be calculated or there are two or less road boundaries in a corresponding direction |
| 1 (there is no change) | - when the number of widths which can be calculated is three or more and m1/N1 is greater than or equal to 0.5, where the total number of calculable widths is N1 and the number of widths the difference between which is less than 1.0 m is m1 |
| 2 (there is a change) | - when the number of widths which can be calculated is three or more and m1/N1 is smaller than 0.5 |
| 3 (determination impossible) | - when the number of calculable widths is less than three |

| Step for location-based determination | Description (Condition) |
|---|---|
| 0 (not to perform) | - when there is no lane line (road boundary) of the generated real-time map (RMG) |
| 1 (there is no change) | - when m2/N2 is greater than 0.7 or greater than or equal to 0.4 or less than 0.7 according to a hysteresis threshold, where N2 is the total length of all comparable road boundaries of the real-time map located inside a bounding box (1.0 m X 0.2 m) or the total length of all road boundaries of the real-time map not located inside a polygon formed by the most left/right lane lines |
| 2 (there is a change) | - when m2/N2 is less than 0.7 or greater than or equal to 0.4 and less than 0.7 according to a hysteresis threshold |
| 3 (determination impossible) | - when there is only lane lines |
| 4 (comparison impossible) | - when there is no comparable road boundary or comparable road boundaries of the real-time map (RMG) are located inside a bounding box formed based on HD map road boundaries |

FIG. 8

| Location-based determination | Width-based determination | MCE status | Scenario |
|---|---|---|---|
| 0 | - | 0 | |
| 1 | 0 | 1 | |
| 1 | 1 | 1 | |
| 1 | 2 | 3 | |
| 1 | 3 | 1 | |
| 2 | 0 | 2 | |
| 2 | 1 | 3 | |
| 2 | 2 | 2 | |
| 2 | 3 | 2 | |
| 4 | - | 3 | This is a case where there is no comparable road boundary of the HD map with respect to any road boundary of the real-time map |

FIG. 10

AUTONOMOUS DRIVING CONTROL METHOD AND VEHICLE THEREOF

CROSS-REFERENCE TO RELATED APPLICATION

The present application claims priority to Korean Patent Application No. 10-2022-0110063, filed on Aug. 31, 2022, the entire contents of which is incorporated herein for all purposes by this reference.

BACKGROUND OF THE PRESENT DISCLOSURE

Field of the Present Disclosure

The present disclosure relates to an autonomous driving control method and a vehicle thereof.

Discussion of Related Art

In general, an autonomous vehicle detects an object in a surrounding environment of the vehicle using a Light Detecting and Ranging (LiDAR), a camera, a radar, and the like, establishes an autonomous driving strategy according to the detection result, and controls vehicle components such as a steering device, a brake, a driving device, and the like according to the strategy, performing autonomous driving.

The localization is an essential element for the operation of the autonomous vehicle, and the majority of autonomous driving performed autonomous driving based on a high definition (HD) map.

When the autonomous driving based on a HD map is performed, if the map is different from the current road driving environment, the accuracy of the localization is affected, and furthermore, the stable driving of the autonomous vehicle is greatly affected.

For current autonomous driving, HD map information identical to the current road driving environment is essential, but it is difficult to have the same HD map information as the road driving environment each time due to cost/time constraints.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing the autonomous driving control method and the vehicle thereof configured for performing more safe autonomous driving through generation of a route without map matching or using a HD map, discontinuation of operation of an autonomous driving system, and user guidance when it is determined that an actual road environment includes a shape different from a HD map.

Furthermore, the exemplary embodiment provides the autonomous driving control method and the vehicle thereof configured for performing more safe autonomous driving through discontinuation of operation of an autonomous driving system, or user guidance, or generation of a route without map matching or using a HD map when it is determined that an actual road environment includes a shape different from a HD map.

Technical problems to be solved in the exemplary embodiments are not limited to the technical problems mentioned above, and other technical problems not mentioned will be clearly understood by those skilled in the art from the following description.

An autonomous driving control method according to an exemplary embodiment of the present disclosure includes, extracting from high definition (HD) map data an HD road boundary and an HD lane line, generating a real-time map representing a road environment around the vehicle using sensor information detected by a sensor mounted on the vehicle, extracting a real-time road boundary and a real-time lane line based on the generated real-time map, and comparing the HD road boundary with the real-time road boundary and the HD lane line with the real-time lane line, and determining whether the HD map data is discrepant with the real-time map based on a result of the comparing.

In at least an exemplary embodiment of the present disclosure, the method further includes turning off an autonomous driving mode for the vehicle or providing a notification signal to a driver of the vehicle according to the result of the comparing.

In at least an exemplary embodiment of the present disclosure, the extracting of the HD road boundary and the HD lane line includes extracting a HD-map-based location based on the HD road boundary and extracting a HD-map-based lane width based on the HD lane line, and wherein the extracting of the real-time road boundary and the real-time lane line includes extracting a real-time-based location based on the real-time road boundary and extracting a real-time-based lane width based on the real-time lane line.

In at least an exemplary embodiment of the present disclosure, the extracting of the HD-map-based lane width includes extracting the HD-map-based lane width based on a distance between the HD lane line and a neighboring HD lane line, or wherein the extracting of the real-time-based lane width includes extracting the real-time-based lane width based on a distance between the real-time lane and a neighboring real-time lane.

In at least an exemplary embodiment of the present disclosure, the comparing of the HD road boundary with the real-time road boundary includes comparing the HD-map-based location and the real-time-based location.

In at least an exemplary embodiment of the present disclosure, the comparing of the HD lane line with the real-time lane line includes comparing the HD-map-based lane width with the real-time-based lane width.

According to an exemplary embodiment of the present disclosure, an autonomous vehicle includes at least one sensor mounted on the vehicle, and a processor mounted on the vehicle and configured to control autonomous driving, wherein the processor is configured to extract from high definition (HD) map data a HD road boundary and a HD lane line, generate a real-time map indicating a road environment around the vehicle using sensor information provided from the sensor, extract a real-time road boundary and a real-time lane line based on the generated real-time map, compare the HD road boundary with the real-time road boundary and the HD lane line with the real-time lane line, and determine whether the HD map data is discrepant with the real-time map based on a result of the comparing.

In at least an exemplary embodiment of the present disclosure, the processor is further configured to turn off an autonomous driving mode for the vehicle or provide a notification signal to a driver of the vehicle according to the result of the comparing.

In at least an exemplary embodiment of the present disclosure, the processor is further configured to extract a HD-map-based location based on the HD road boundary and a HD-map-based lane width based on the HD lane line, and extract a real-time-based location based on the real-time road boundary and a real-time-based lane width based on the real-time lane line.

In at least an exemplary embodiment of the present disclosure, the processor is further configured to extract the HD-map-based lane with based on a distance between the HD lane line and a neighboring HD lane line, or extract the real-time-based lane width based on a distance between the real-time lane line and a neighboring real-time lane line.

In at least an exemplary embodiment of the present disclosure, the processor is further configured to compare the HD-map-based location with the real-time-based location.

In at least an exemplary embodiment of the present disclosure, the processor is further configured to compare the HD-map-based lane width with the real-time-based lane width.

The autonomous driving control method and the vehicle thereof according to an exemplary embodiment of the present disclosure, when it is determined that an actual road environment includes a shape different from a HD map using various data detected while driving, may generate a route without map matching or using the HD map, or may stop driving by an autonomous driving system and may effectively perform safe autonomous driving through user guidance.

The autonomous driving control method and the vehicle thereof according to various exemplary embodiments of the present disclosure may compare and analyze a real-time map and a HD map according to a road driving environment, and may stop autonomous driving when it is determined that the analyzed result value is inconsistent, reducing a risk which may occur due to a change in a road environment.

The effects obtainable from the exemplary embodiment are not limited to the above-mentioned effects, and other effects not mentioned will be clearly understood by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 7 shows tables for determining a width-base change and a location-based change by step with respect to a lane according to an exemplary embodiment of the present disclosure.

FIG. 8 shows tables for determining a width-base change and a location-based change by step with respect to a road boundary according to an exemplary embodiment of the present disclosure.

FIG. 10 shows a table for determining a final change for road boundaries by considering both the location- and width-based change determinations according to the exemplary embodiment of the present disclosure.

Figure 1:
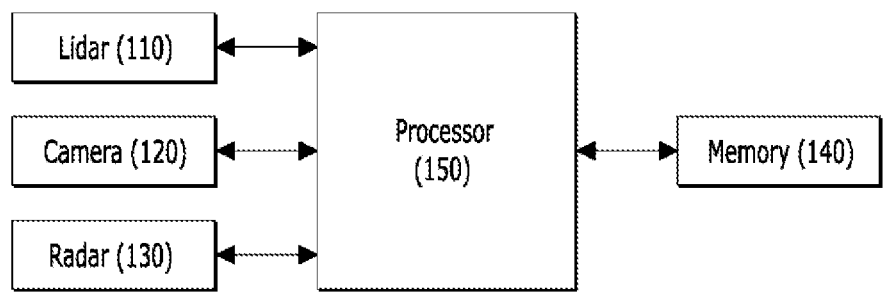
FIG. 1 is a block diagram of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the exemplary embodiments included in the present specification will be described in detail with reference to the accompanying drawings, and the same or similar constituent elements will be provided the same reference numerals regardless of the reference numerals, and redundant descriptions thereof will be omitted.

In the following description, a suffix "unit" of a component is provided or used in consideration of only the ease of preparation of a specification, and is not necessarily physically divided or separated. For example, the "oo unit" may be a constituent element that performs a function different from the "xx unit", but may be implemented so that the functions are not physically distinguished or separated and are performed in parallel or time-sequentially in one same microprocessor, and the suffix "unit" does not exclude this. This is also applied to the suffix "module".

Furthermore, in describing the exemplary embodiments included in the present specification, when it is determined that the detailed description of the related known technology may obscure the gist of the exemplary embodiments included in the present specification, the detailed description thereof will be omitted.

Furthermore, the accompanying drawings are merely provided to easily understand the exemplary embodiments included in the present specification, and the technical spirit included in the present specification is not limited by the accompanying drawings, and it should be understood that all changes and substitutes within equivalents included in the spirit and technical scope of the present disclosure are included.

Terms including ordinals such as first, second, etc. may be used to describe various elements, but the elements are not limited by the terms. The terms are used only for distinguishing one component from another component, and should not be construed as determining an order among components by use of only the name.

Furthermore, unless the reference to "up/top" or "down/bottom" is naturally determined from each of the components or an attribute between the components or is otherwise expressed in the specification, the reference may be used to express a relative location relationship between the components based on an appearance shown in the drawing for convenience in principle, and should not be understood as limiting the locations of actual components.

For example, "B positioned above A" is merely an indication that B is shown above A in the drawings, unless otherwise stated or B should not be positioned above A due to the property of A or B, and in the actual product or the like, B may be positioned below A and B and A may be disposed side by side and left and right.

The term "and/or" may be used to include any combination of a plurality of items to be included. For example, "A and/or B" includes all three cases such as "A", "B", and "A and B".

When it is mentioned that a component is "connected" or "linked" to another component, the component may be directly connected or connected to the other component, but it should be understood that the other component may exist therebetween. On the other hand, when it is mentioned that a certain element is "directly connected" or "directly linked" to another element, it should be understood that there is no other element therebetween.

A singular expression includes a plural expression unless the context clearly indicates otherwise.

In the present specification, it should be understood that the term "include" or "have" is intended to designate the presence of a feature, a number, a step, an operation, a component, a part, or a combination thereof described in the specification, but does not exclude the possibility of the presence or addition of one or more other features, numbers, steps, operations, components, parts, or combinations thereof in advance.

Unless otherwise defined, all terms used herein, including technical or scientific terms, include the same meaning as that generally understood by those skilled in the art to which the present disclosure pertains. It will be further understood that terms, such as those defined in commonly used dictionaries, should be interpreted as having a meaning that is consistent with their meaning in the context of the relevant art and will not be interpreted in an idealized or overly formal sense unless so defined herein.

Furthermore, the unit or the control unit is a term widely used for naming a controller that outputs a control value or a command for a specific function with respect to other components, and does not mean a generic function unit. For example, each unit or control unit may include an input/output device for exchanging signals with another controller or sensor to control a function in charge, a memory for storing an operating system or a logic command, input/output information, and the like, and one or more microprocessors for performing determination calculation, and the like required for a function in charge.

Hereinafter, the operation principle and embodiments of the present disclosure will be described with reference to the accompanying drawings.

Figure 2:
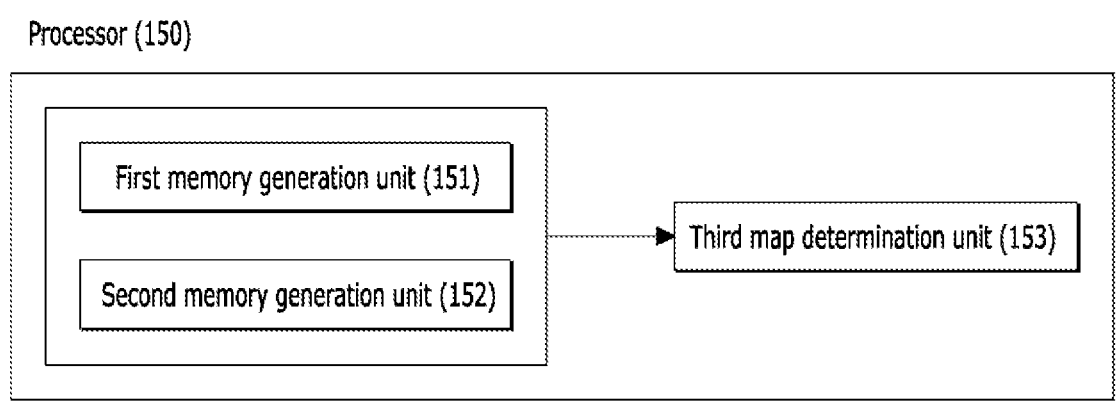
FIG. 2 is a block diagram of a processor according to an exemplary embodiment of the present disclosure.

FIG. 1 is a block diagram of a vehicle according to the exemplary embodiment of the present disclosure, and FIG. 2 is a block diagram of a processor according to the exemplary embodiment of the present disclosure.

The vehicle 10 may include a Light Detection and Ranging (LiDAR) 110, a memory 140, and/or a processor 150.

The LiDAR 110 may be one or a plurality of LiDARs, and may be mounted outside the main body of the vehicle 10 to irradiate a laser pulse toward the periphery of the vehicle 10 to an object, and then measure a return time of the laser pulse reflected from the object within a measurement range to detect information such as a distance to the object, a direction and a speed of the object. Here, the object may be another vehicle, a person, an object, or the like existing outside the vehicle.

The LiDAR 110 outputs a detecting result as LiDAR data. The LiDAR data may be output in a form of point cloud data including a plurality of points for a single object.

The vehicle 10 may include at least one of a camera 120 and a radar 130 for sensor fusion.

The memory 140 may store various data used in at least one device of the vehicle 10. The memory 140 may store input data and/or output data for a software program and a command related thereto. For example, the memory 140 may store sensor information provided from the LiDAR 110, the camera 120, and the radar 130, and may store a real-time map generated based on the sensor information, a HD map around the user's vehicle based on a current location, and the like.

The memory 140 may store a software program for comparing and analyzing the real-time map and the HD map and detecting a change in the map based on the analyzed result.

The memory 140 may include a cache, a Read Only Memory (ROM), a Programmable ROM (PROM), an Erasable Programmable ROM (EPROM), an Electrically Erasable Programmable ROM (EEPROM), and/or a non-volatile memory such as flash memory, and/or a volatile memory such as a Random Access Memory (RAM).

The processor 150 may be configured for controlling at least one device of the vehicle 10 (for example, the LiDAR 110, the camera 120, the radar 130, and/or the memory 140). The processor 150 may perform various data processing and determinations to control at least one device of the vehicle 10.

Although not shown, the processor 150 may include a first processor configured for detecting an object around the vehicle 10 by controlling the LiDAR 110, the camera 120, the radar 130, and the like, and a second processor configured for controlling autonomous driving of the vehicle 10 by controlling the LiDAR 110, the camera 120, the radar 130, and the like. The first processor and the second processor may be implemented as respective physically separated processors, but are not necessarily limited thereto. For example, the first processor or the second processor may be integrated into one processor.

The processor 150 may be configured to generate a real-time map of the surroundings of the vehicle 10, which is being driven, based on sensor information provided from at least one of the LiDAR 110, the camera 120, and the radar 130.

The processor 150 may receive a HD map around the vehicle 10 based on a current location through a communication module disposed in the vehicle. It is not limited thereto, and the processor 150 may receive a HD map through various methods.

The processor 150 may compare and analyze the real-time map and the HD map generated based on the sensor information, and determine whether the maps are discrepant based on the analyzed result. For example, the processor 150 may be configured to determine that there is a change in a road boundary or a lane line based on the analyzed result. A detailed description thereof will be described later.

Referring to FIG. 2, the processor 150 may include a map generation unit 151 and 152 and a map determination unit 153. In the description, the units described above or below may be implemented in respective processors or as integrated in the processor 150.

The map generation unit 151 and 152 may include a first map generation unit 151 configured to generate a real-time map based on sensor information provided in real time from at least one sensor mounted on the vehicle, and a second map generation unit 152 configured to receive information (i.e., HD map data) about a HD map of the surroundings of the vehicle.

The first map generation unit 151 may be electrically connected to the LiDAR 110, the camera 120, the radar 130, and the like, and may receive various sensor information from them.

The first map generation unit 151 may provide first map information including information related to the generated real-time map to the map determination unit 153 in real time. The first map generation unit 151 may be referred to as a Real-time Map Generation (RMG) unit.

The second map generation unit 152 may be electrically connected to a communication module mounted on the vehicle and the memory 140, and may receive information of a HD map from the communication module and the memory.

The second map generation unit 152 may provide second map information including HD map data of roads, lanes, road structures, and the like, which are in the vicinity of the vehicle (or the host vehicle), to the map determination unit 153. The second map generation unit 152 may be referred to as a map handler.

The map determination unit 153 may compare and analyze the first map information provided from the first map generation unit 151 and the second map information provided from the second map generation unit 152, and may be configured to determine a change between the maps based on the analyzed result. The map determination unit 153 may analyze a location-based change and a width change of a lane based on the first map information and the second map information, respectively, and may be configured to determine whether the corresponding road environment has been changed because the HD map was established.

The map determination unit 153 may be configured to determine actual location (i.e., real-time-based location) data of a road boundary or a lane-line through the first map information, and extract HD map location (i.e., HD-map-based location) data for a location of a road boundary or a lane line through the second map information. The map determination unit 153 may compare and analyze the determined actual location data with the extracted HD map location data, determining whether there is a change or not.

The map determination unit 153 may be configured to determine actual width (i.e., real-time-based lane width) data which is obtained through the first map information, and extract HD map width (i.e., HD-map-based lane width) data through the second map information. The map determination unit 153 may compare and analyze the determined actual width data with the extracted HD map width data, determining whether there is a change or not.

The map determination unit 153 may be referred to as a map change estimation unit.

Figure 3:
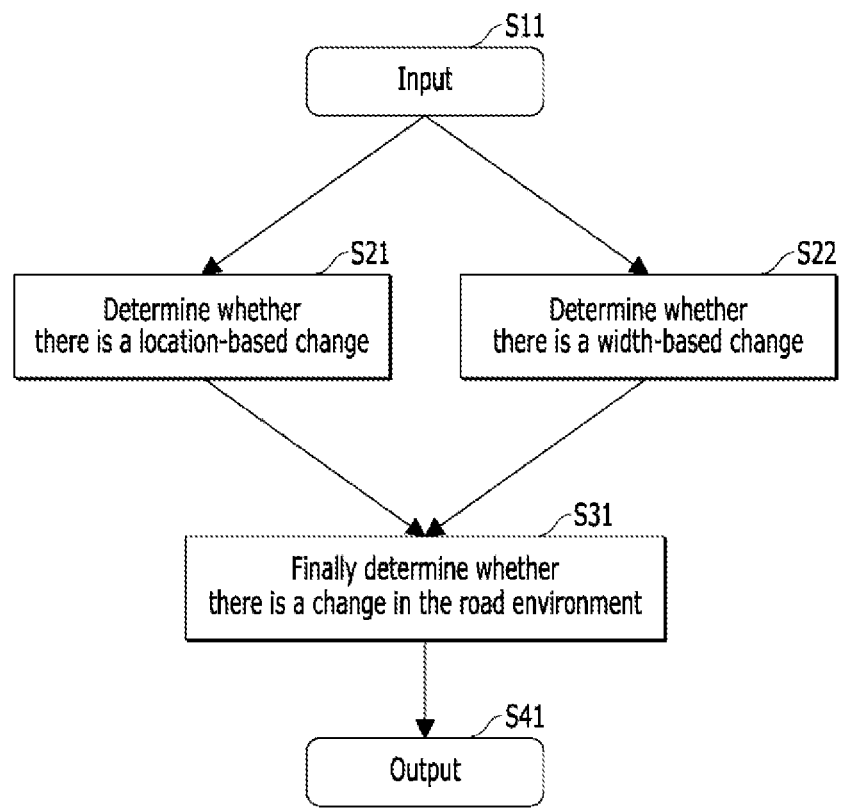
FIG. 3 is a flowchart of an operation of a processor according to an exemplary embodiment of the inventive concept.
Figure 4:
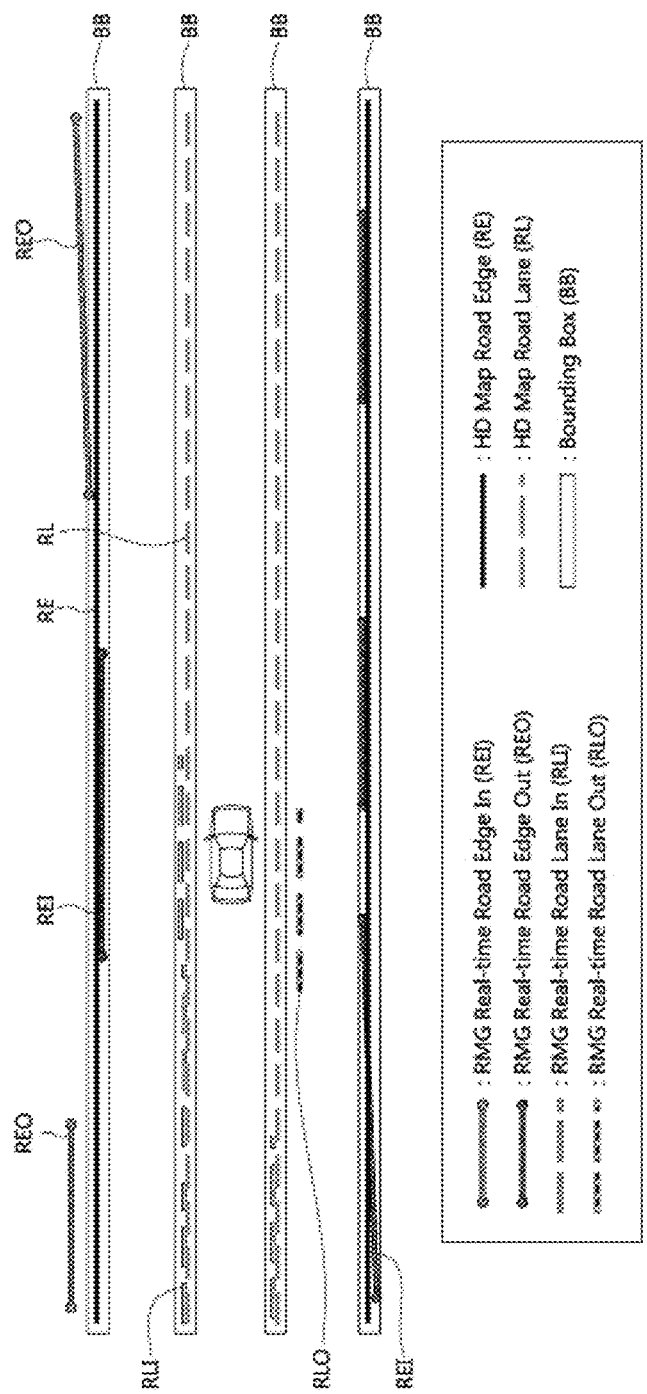
FIG. 4, FIG. 5 and FIG. 6 are diagrams for explaining whether a lane or a road boundary is changed according to the exemplary embodiment of the present disclosure.
Figure 5:
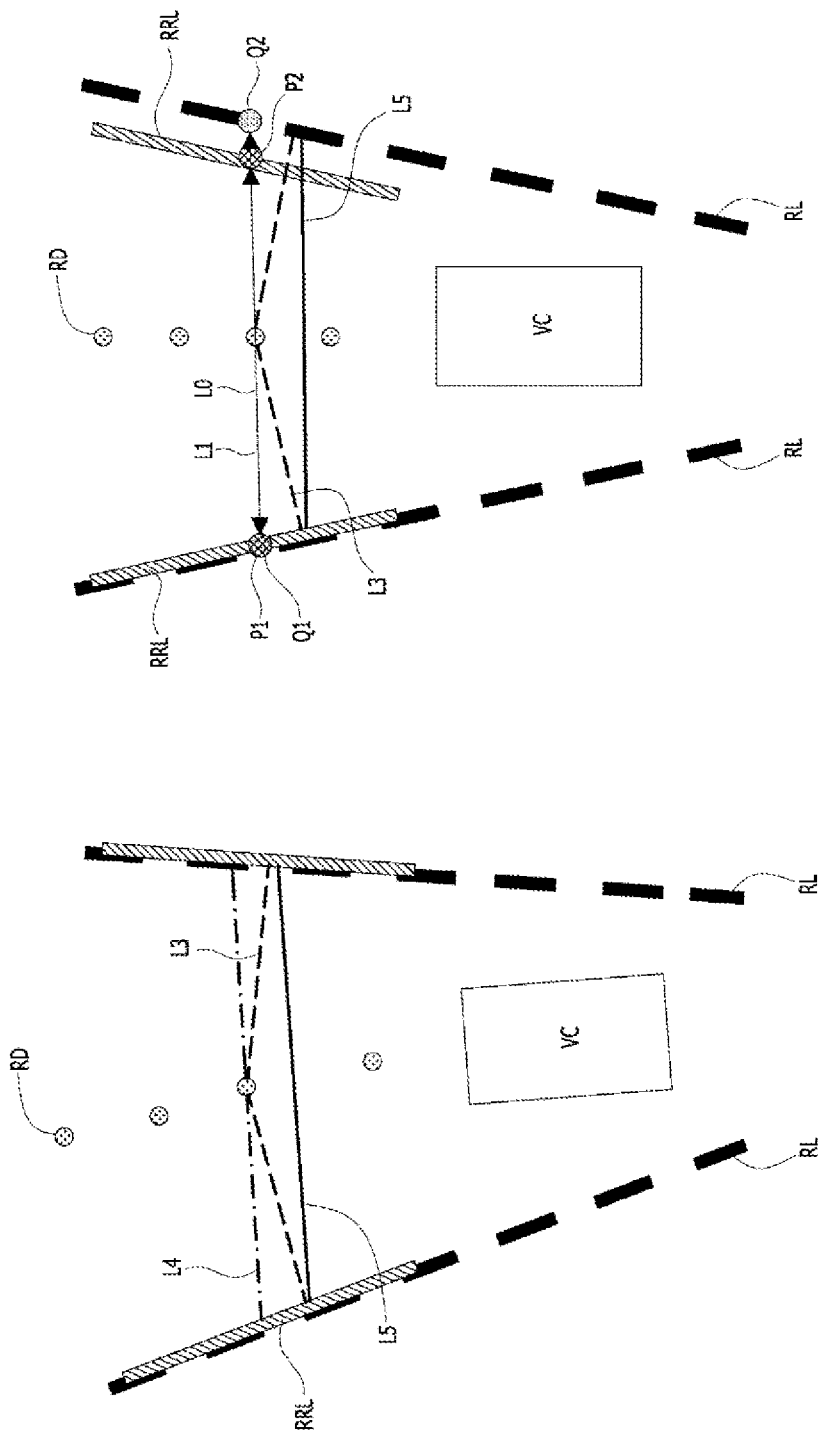
Figure 6:
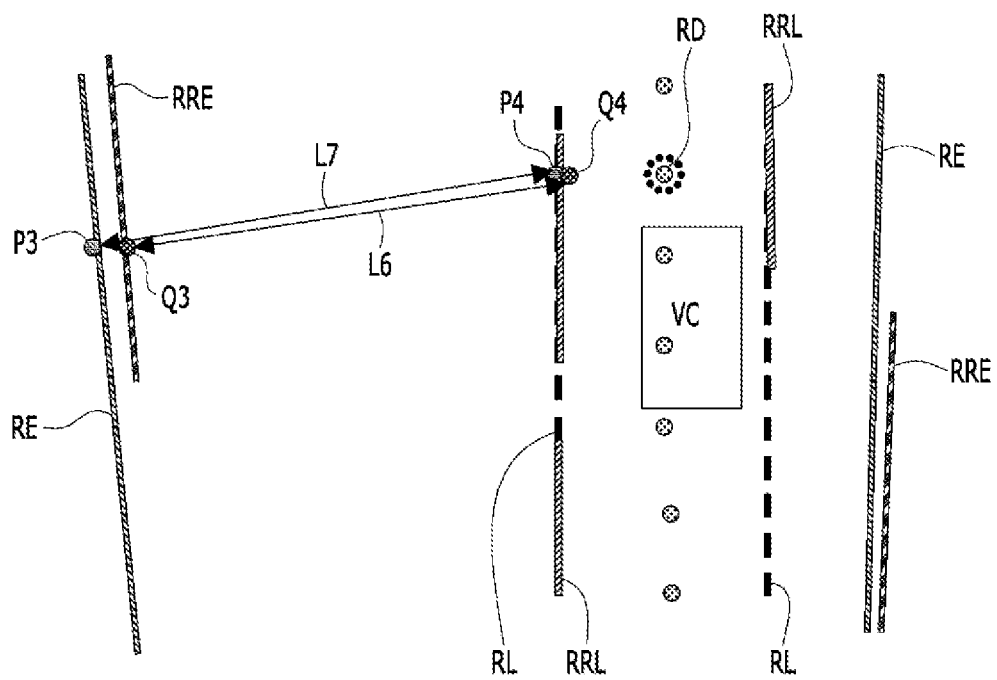

FIG. 3 is a flowchart illustrating an operation of a processor according to an exemplary embodiment of the present disclosure. FIG. 4, FIG. 5 and FIG. 6 are diagrams for explaining a determination process of whether a lane or a road boundary is changed according to the exemplary embodiment of the present disclosure.

Referring to FIG. 3, the operation of the processor 150 according to the exemplary embodiment of the present disclosure is as follows.

The processor 150 may be configured to generate a Real-time Map Generation (RMG) based on the sensor information (S11). The processor 150 may receive, from the second map generation unit 152, a HD map around the host vehicle based on the current location. The processor 150 may receive a HD map in advance and store the HD map in the memory, or may receive the HD map in real time. The present disclosure is not limited thereto, and a HD map may be provided using various methods or routes.

Thereafter, the processor 150 may be configured to determine whether there is a change in the road boundary or the lane line using data regarding the road boundary or the lane line in the HD map and the real-time map (S21, S22). For example, the processor 150 may be configured to determine whether there is a location-based change or a width-based change.

The processor 150 may be configured to determine that there is a location-based change by comparing a location estimated from the sensor information with the location of a road boundary or a lane line provided by the HD map. The location estimated from the sensor information may be a location of the road boundary or the lane line on the real-time map generated based on the sensor information.

As shown in FIG. 4, a solid line RE represents a road boundary on a HD map, a broken line RL represents a lane line on the HD map, and a long region BB including the solid line RE or the broken line RL represents a bounding box on the HD map.

A first solid line REI represents a real-time road boundary located within the bounding box on the real-time map, a second solid line REO represents a real-time road boundary deviating from the bounding box on the real-time map, a first broken line RLI represents a real-time lane line located within the bounding box on the real-time map, and a second broken line RLO represents a real-time lane line deviating from the bounding box on the real-time map.

The processor 150 may be configured to generate the bounding box, i.e., the region BB considering a localization/sensor error, based on a HD map. The bounding box BB may include a predetermined area along a road boundary or a lane line marked on the HD map. For example, the bounding box BB may be generated surrounding a road boundary or a lane line on a HD map within a predetermined error range.

The processor 150 may be configured to determine whether a generated individual real-time road boundary or lane line or a line segment of the road boundary or the lane line is located inside the bounding box, and determine whether there is a road change based on the determination. As illustrated in FIG. 4, the processor 150 may be configured to determine that the road boundary or the lane line has been changed with respect to the second solid line REO and the second broken line RLO, and may be configured to determine that the road boundary or the lane line has not been changed with respect to the first solid line REI and the first broken line RLI.

As described above, the processor 150 may be configured to determine whether there is a change in a road system/lane by considering all the results determined from the individual line segments.

The processor 150 may be configured to determine the width-based change by comparing the width of the road boundary or the lane estimated from the sensor information with the lane width provided by the HD map.

For example, the HD map data may include road-link data for representing roads, lane-link data for representing lanes, and line-link data for representing lane lines on the HD map, and a set of lane-link data for a lane may include a plurality of nodes spaced with constant intervals along the center line of the lane. In FIG. 5, a central point RD may represent a node for the lane link of a lane on a HD map (the central point RD may be a reference point for lane width determination as described below), a broken line RL represents a lane line on the HD map, a real solid line RRL represents a lane line on a real-time map, the lines L3 represents perpendiculars from a central point RD, the length of the line L4 indicates the lane width at the central point RD, the length of the line L5 indicates the distance between the two feet of the perpendiculars, first points P1 and P2 represent points which the line L0 parallel to the line L5 and crossing the central point RD meets with the lane lines RRL of the real-time map at, and second points Q1 and Q2 represents points at which the line L1 parallel to the line L5 and crossing the central point RD meets with the broken lines RL of the HD map.

The processor 150 may apply the above described process to all of the central points RDs.

The processor 150 may be configured to determine the distance between the first left/right points P1 and P2 by the length of the line L0.

The processor 150 may be configured to determine the distance between the second left/right points Q1 and Q2 by the length of the line L1.

The processor 150 may compare the distances L0 and L1, and determine that there is a change in the lane width with respect to the corresponding central point RD when the difference between the two distances L0 and L1 is greater than a preset distance, and otherwise determine that there is no change. The preset distance may be about 0.4 m to 0.6 m, and 0.5 m.

The processor 150 may perform the comparison and determination process for each central point RD. For example, the processor 150 may perform the comparison and determination for the lane width determination for each central point RD to output a width-based change determination result using the ratio between changes and non-changes.

In FIG. 6, the solid line RE represents a road boundary of the HD map, a third solid line RRE represents a road boundary of the real-time map, third points P3 and P4 represent points which are a foot of a perpendicular from a central point RD (which may be the nearest point RD in front of the host vehicle VC) to the solid line RE and a foot of a perpendicular from the central point RD to the broken line RL, respectively, and fourth points Q3 and Q4 represent points which are a foot of a perpendicular from the central point RD to the solid line RRE and a foot of a perpendicular from the central point RD to the real solid line RRL, respectively.

The processor 150 may be configured to determine the length of the line L6 connecting the points Q3 and Q4.

The processor 150 also may be configured to determine the length of the line L7 connecting the points P3 and P4.

The processor 150 may compare the distances L6 and L7, and when the difference therebetween is greater than a preset distance, may be configured to determine that there is a change in the road boundary and the lane width with respect to the corresponding central point RD, and otherwise no change. The preset distance may be about 0.9 m to 1.1 m, and preferably 1.0 m. As described above, the processor 150 may finally determine whether there is a change of the road boundary or the lane line by performing the location-based change determination and the width-based change determination for each road boundary or lane line and considering both the two results (S31).

Figure 9:
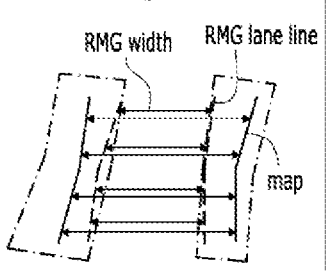
FIG. 9 shows a table for determining a final change for lane lines by considering both the location- and width-based change determinations according to the exemplary embodiment of the present disclosure.

For example, the processor 150 may finally determine that there is a change by considering the location-based and width-based determination information, and may output accordingly one among 'there is a change,' 'there is no change,' or 'determination is impossible.' A detailed description thereof will be provided with reference to FIGS. 7 to 9.

When it is finally determined that there is a change, the processor 150 may output the result based on the determined result (S41).

In an exemplary embodiment of the present disclosure, the processor is further configured to turn off an autonomous driving mode for the vehicle or provide a notification signal to a driver of the vehicle according to the result of the comparing of S31.

FIG. 7 shows tables for determining a width-base change and a location-based change by step with respect to a lane according to an exemplary embodiment of the present disclosure, and FIG. 8 shows tables for determining a width-base change and a location-based change by step with respect to a road boundary according to an exemplary embodiment of the present disclosure.

Referring to FIG. 7, the processor 150 may be configured to determine a change in a lane based on width-based change information, and may be configured to determine the change as one among zero to third steps.

When there is no point for determining the width of a lane of the input real-time map (RMG), the processor 150 may be configured to determine not to perform the process for the determination and set the determination step to zero.

When the number of widths which may be determined is three or more and m/N is greater than or equal to 0.4, where N is the total number of widths which may be determined and m is the number of intervals the interval difference of which is less than 0.5 m, the processor 150 may be configured to determine that there is no change and may set the step to the first step.

When the number of widths which may be determined is three or more and when m/N is less than 0.4, the processor 150 may be configured to determine that there is a change and set the step to the second step.

When the number of widths which may be determined is less than three, the processor 150 may be configured to determine that the determination is impossible and set the step to the third step.

Furthermore, the processor 150 may be configured to determine a change in the lane based on the location-based change information, and may be configured to determine the change in the lane as one among zero to third steps.

When there is no lane (road boundary) of the generated real-time map (RMG), the processor 150 may be configured to determine not to perform the process and may set the step to the zero step.

When the total length of all comparable lane lines of the real-time map is N, and the total length of all lane lines of the real-time map located inside a bounding box is m, when m/N is greater than 0.7 or is greater than or equal to 0.4 and less than 0.7 according to a hysteresis threshold, the processor 150 may be configured to determine that there is no change, and may set the step to the first step. In the instant case, the bounding box may be set to '1.0 m×0.3 m.'

If m/N is less than 0.4 or greater than 0.4 and less than 0.7 according to a hysteresis threshold, the processor 150 may be configured to determine that there is a change and set the step as the second step.

When the number of the lane lines of the real-time map do not satisfy a preset minimum number, the processor 150 may be configured to determine that determination is impossible, and may set the step to the third step.

Referring to FIG. 8, the processor 150 may be configured to determine a change in a road boundary based on width-based change information, and may be configured to determine the change in the road boundary as one among zero to fourth steps.

When there is no road boundary on the real-time map (RMG) a width between which and a lane line may be determined or there are two or less road boundaries in a corresponding direction, the processor 150 may be configured to determine not to perform the process and set the step to the zero step.

When the number of widths which may be determined is three or more and m1/N1 is greater than or equal to 0.5, where the total number of calculable widths is N1 and the number of widths the difference between which is less than 1.0 m is m1, the processor 150 may be configured to determine that there is no change and set the step to the first step.

When the number of widths which may be determined is three or more and m1/N1 is smaller than 0.5, the processor 150 may be configured to determine that there is a change, and set the step to the second step.

When the number of the calculable widths is less than three, the processor 150 may be configured to determine that determination is impossible and set the step to the third step.

Furthermore, the processor 150 may be configured to determine a change in the road boundary based on the location-based change information, and may be configured to determine the change as one among zero to fourth steps.

When there is no lane line (road boundary) of the generated real-time map (RMG), the processor 150 may be configured to determine not to perform and may set the step to the zero step. That is, when the lane line (road boundary) of the real-time map (RMG) is not generated, the processor 150 may set the step to the zero step and determine not to perform the location-based determination process.

When the total length of all comparable road boundaries of the real-time map is N2 and the total length of all road boundaries of the real-time map located inside a bounding box or the total length of all road boundaries of the real-time map not located inside a polygon formed by the most left/right lane lines is m2, when m2/N2 is greater than 0.7 or is greater than or equal to 0.4 or less than 0.7 according to a hysteresis threshold, the processor 150 may be configured to determine that there is no change and set the step to the first step. In the instant case, the bounding box may be set to '1.0 m×2.0 m.'

If m2/N2 is less than 0.7 or is greater than or equal to 0.4 and less than 0.7 according to the hysteresis threshold, the processor 150 may be configured to determine that there is a change and set the step to the second step.

When there is only lane lines, the processor 150 may be configured to determine that determination is impossible, and set the step to the third step. In the instant case, the processor 150 may only set the step to the third step and may not output.

When there is no comparable road boundary or comparable road boundaries of the real-time map (RMG) are located inside a bounding box formed based on HD map road boundaries, the processor 150 may be configured to determine that comparison is impossible and set the step to the fourth step. The bounding box may be set to be '3.0 m×10.0 m.'

The processor 150 may be configured to generate a bounding box based on the HD map road boundary when comparison is possible, but generate a box (e.g., 3.0 m×10.0 m) greater than the box for determining whether the location is changed, and determine that there is no change or a change since the comparison is possible when there is an RMG road boundary in the corresponding box. That is, when the real-time map (RMG) line segment does not exist in a corresponding bounding box, the processor 150 may define it as 'comparison impossible.'

As described above, the processor 150 may be configured to determine the zero step (not performed) when the generation is not performed, the fourth step (comparison impossible) when there is no object to be compared, and may be configured to determine the first step (there is no change) or the second step (there is a change) according to the ratio in other cases.

FIG. 9 shows a table for determining a final change for lane lines by considering both the location- and width-based change determinations according to the exemplary embodiment of the present disclosure., and FIG. 10 shows a table for determining a final change for road boundaries by considering both the location- and width-based change determinations according to the exemplary embodiment of the present disclosure.

Referring to FIG. 9, the processor 150 may finally determine whether there is a change by considering change determination results which are obtained by individually performing change determination for a lane based on distance/location-based change information. That is, the processor 150 may be configured to determine or decide suitably in accordance with each situation when the location-based determination is different from the width-based determination.

For example, when the location-based determination is in the zero step and there is no width-based determination, the map determination unit 153 may finally determine or decide the location-based determination as the zero step under the control of the processor 150.

When the location-based determination is the first step and the width-based determination is the first step, the map determination unit 153 may finally determine or decide the first step under the control of the processor 150.

When the location-based determination is the first step and the width-based determination is the second step, the map determination unit 153 may finally determine or decide the second step under the control of the processor 150.

For example, the map determination unit 153 may set the final determination or decision to the second step only when two or more lanes of the real-time map (RMG) fail under the control of the processor 150. For example, the location of the lane may be within a bounding box but the width may have changed.

When the location-based determination is the first step and the width-based determination is the third step, the map determination unit 153 may finally determine or decide the first step under the control of the processor 150.

When the location-based determination is the second step and the width-based determination is the first step, the map determination unit 153 may finally determine or decide the second step under the control of the processor 150.

For example, the map determination unit 153 may set the final determination or decision to the second step only when two or more lanes of the real-time map (RMG) fail under the control of the processor 150. For example, the road may be shifted to have the same width.

When the location-based determination is the second step and the width-based determination is the second step, the map determination unit 153 may finally determine or decide the second step under the control of the processor 150.

When the location-based determination is the second step and the width-based determination is the third step, the map determination unit 153 may finally determine or decide the second step under the control of the processor 150.

When the location-based determination is the third step and the width-based determination is the first step, the map determination unit 153 may finally determine or decide the third step under the control of the processor 150.

When the location-based determination is the third step and the width-based determination is the second step, the map determination unit 153 may finally determine or decide the third step under the control of the processor 150.

When the location-based determination is in the third step and the width-based determination is in the third step, the map determination unit 153 may finally determine or decide the third step under the control of the processor 150.

Referring to FIG. 10, the processor 150 may finally decide the determination of the change by considering the change determination results which are obtained by individually performing change determination with respect to a road boundary based on distance/location-based change information.

When the location-based determination is at the zero step and there is no width-based determination, the map determination unit 153 may finally determine or decide the zero step under the control of the processor 150.

When the location-based determination is the first step and the width-based determination is the zero step, the map determination unit 153 may finally determine or decide the first step under the control of the processor 150.

When the location-based determination is the first step and the width-based determination is the first step, the map determination unit 153 may finally determine or decide the first step under the control of the processor 150.

When the location-based determination is the second step and the width-based determination is the first step, the map determination unit 153 may finally determine or decide the third step under the control of the processor 150.

When the location-based determination is the second step and the width-based determination is the second step, the map determination unit 153 may finally determine or decide the second step under the control of the processor 150.

When the location-based determination is the second step and the width-based determination is the third step, the map determination unit 153 may finally determine or decide the second step under the control of the processor 150.

When the location-based determination is performed at the fourth step and the width-based determination is not performed, the map determination unit 153 may finally determine or decide the third step under the control of the processor 150.

As described above, under the control of the processor 150, the map determination unit 153 may use the location-based determination result as it is in the case of the road boundary. However, when the location-based determination is the first step and the width-based determination is the second step, or when the location-based determination is the second step and the width-based determination is the first step, the determination results are different from each other (it is determined that there is a change in one side, and it is determined that there is no change in the other side), the map determination unit 153 may output the result as the third step that cannot be determined since the accurate situation may not be known.

Furthermore, the map determination unit 153 may define the fourth step instead of the third step for more accurate determination and may output the final output as the third step (undeterminable) since the comparison is impossible because there is no comparison target when the location-based determination is the fourth step under the control of the processor 150

As described above, the present disclosure may compare and analyze a real-time map and a HD map according to a road driving environment, and when it is determined that the analyzed result value is inconsistent, stop autonomous driving, reducing a risk which may occur due to a change in a road environment.

That is, according to an exemplary embodiment of the present disclosure, it is determined whether sensor information and HD map information are identical to each other, whether a difference to affect localization is detected when there is the difference. Also, location-based change determination and width-based change determination are performed together, more stably detecting a change.

When the HD map change detection function is used as disclosed in an exemplary embodiment of the present disclosure, a risk which may occur due to a change in a road environment during autonomous driving may be reduced, and corresponding change determination information may be accumulated to be used for maintenance and repair of a HD map.

The above-described embodiments may be implemented in a form of a recording medium for storing instructions executable by a computer. The instructions may be stored in a form of a program code, and when executed by a processor, may be configured to generate a program module to perform operations of the disclosed exemplary embodiments of the present disclosure. The recording medium may be implemented as a computer-readable recording medium.

The computer-readable recording medium includes all types of recording media in which computer-readable instructions are stored. For example, there may be a Read Only Memory (ROM), a Random Access Memory (RAM), a magnetic tape, a magnetic disk, a flash memory, an optical data storage device, etc.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the exemplary embodiment of the present disclosure may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous driving control method which is performed in a vehicle by a processor executing computer program stored in a non-transitory computer readable storage medium, the method comprising:
    extracting from high definition (HD) map data an HD road boundary and an HD lane line;
    generating a real-time map representing a road environment around the vehicle using sensor information detected by a sensor mounted on the vehicle;
    extracting a real-time road boundary and a real-time lane line based on the generated real-time map; and
    comparing the HD road boundary with the real-time road boundary and the HD lane line with the real-time lane line, and determining whether the HD map data is discrepant with the real-time map based on a result of the comparing,
    wherein the extracting of the HD road boundary and the HD lane line includes extracting a HD-map-based location based on the HD road boundary and extracting a HD-map-based lane width based on a distance between the HD lane line and a neighboring HD lane line,
    wherein the extracting of the real-time road boundary and the real-time lane line includes extracting a real-time-based location based on the real-time road boundary and extracting a real-time-based lane width based on a distance between the real-time lane line and a neighboring real-time lane line,
    wherein the extracting of the HD-map-based lane width comprises:
        obtaining two perpendicular lines from a central point to the HD lane line and the neighboring HD lane line, the central point being located in a central line of the HD lane line and the neighboring HD lane line;
        obtaining a first line passing two points at which the two perpendicular lines intersect the HD lane line and the neighboring HD lane line;
        obtaining a second line parallel to the first line and passing through the center point; and
        calculating, as the HD-map-based lane width, a length between two points at which the second line intersects the HD lane line and the neighboring HD lane line,
    wherein the extracting of the real-time-based lane width comprises:
        calculating, as the real-time-based lane width, a length between two points at which the second line intersects the real-time lane line and the neighboring real-time lane line, and
    wherein the comparing of the HD lane line with the real-time lane line includes comparing the HD-map-based lane width with the real-time-based lane width.

2. The autonomous driving control method of claim 1, further including:
    turning off an autonomous driving mode for the vehicle or providing a notification signal to a driver of the vehicle according to the result of the comparing.

3. The autonomous driving control method of claim 1, wherein the comparing of the HD road boundary with the real-time road boundary includes comparing the HD-map-based location and the real-time-based location.

4. A vehicle comprising:
    at least one sensor mounted on the vehicle; and
    a processor mounted on the vehicle and configured to control autonomous driving of the vehicle,
    wherein the processor is configured to:
        extract from high definition (HD) map data a HD road boundary and a HD lane line,
        generate a real-time map indicating a road environment around the vehicle using sensor information detected by the at least one sensor,
        extract a real-time road boundary and a real-time lane line based on the generated real-time map,
        compare the HD road boundary with the real-time road boundary and the HD lane line with the real-time lane line, and determine whether the HD map data is discrepant with the real-time map based on a result of the comparing,
    wherein the processor is further configured to extract a HD-map-based location based on the HD road boundary and a HD-map-based lane width based on the HD lane line, and extract a real-time-based location based on the real-time road boundary and a real-time-based lane width based on a distance between the real-time lane line and a neighboring real-time lane line,
    wherein the processor is further configured to:
        obtain two perpendicular lines from a central point to the HD lane line and the neighboring HD lane line, the central point being located in a central line of the HD lane line and the neighboring HD lane line;
        obtain a first line passing two points at which the two perpendicular lines intersect the HD lane line and the neighboring HD lane line;
        obtain a second line parallel to the first line and passing through the center point;

calculate, as the HD-map-based lane width, a length between two points at which the second line intersects the HD lane line and the neighboring HD lane line; and calculate, as the real-time-based lane width, a length between two points at which the second line intersects the real-time lane line and the neighboring real-time lane line, and wherein the processor is further configured to compare the HD-map-based lane width with the real-time-based lane width.

5. The vehicle of claim 4, wherein the processor is further configured to turn off an autonomous driving mode for the vehicle or provide a notification signal to a driver of the vehicle according to the result of the comparing.

6. The vehicle of claim 4, wherein the processor is further configured to compare the HD-map-based location with the real-time-based location.

* * * * *